(12) United States Patent
Arnason

(10) Patent No.: US 12,474,113 B2
(45) Date of Patent: Nov. 18, 2025

(54) METHOD AND DEVICE FOR HOMOGENEOUS FREEZING

(71) Applicant: LAMBHUSASUND EHF., Akranes (IS)

(72) Inventor: Ingolfur Arnason, Akranes (IS)

(73) Assignee: LAMBHUSASUND EHF., Akranes (IS)

( * ) Notice: Subject to any disclaimer, the term of this patent is extended or adjusted under 35 U.S.C. 154(b) by 779 days.

(21) Appl. No.: 17/638,238

(22) PCT Filed: Aug. 25, 2020

(86) PCT No.: PCT/IS2020/050018
§ 371 (c)(1),
(2) Date: Feb. 25, 2022

(87) PCT Pub. No.: WO2021/038603
PCT Pub. Date: Mar. 4, 2021

(65) Prior Publication Data
US 2022/0333851 A1    Oct. 20, 2022

(30) Foreign Application Priority Data
Aug. 26, 2019  (IS) .......................... 050283

(51) Int. Cl.
*F25D 31/00*    (2006.01)
*A23B 2/80*    (2025.01)
(Continued)

(52) U.S. Cl.
CPC .......... *F25D 31/001* (2013.01); *A23B 2/8033* (2025.01); *A23B 2/82* (2025.01);
(Continued)

(58) Field of Classification Search
CPC .. F25D 31/001; F25D 29/00; F25D 2331/804; F25D 2400/30; F25D 13/06;
(Continued)

(56) References Cited

U.S. PATENT DOCUMENTS 2,315,768 A    4/1943   Burnette
3,389,744 A    6/1968   Sullivan et al.
(Continued)

FOREIGN PATENT DOCUMENTS

CN    207006646 U         2/2018
CN    110254340 A    *    9/2019    ............... B60H 1/32
(Continued)

OTHER PUBLICATIONS

PCT International Search Report and Written Opinion for corresponding International Application Serial No. PCT/IS2020/050018, mailed Nov. 30, 2020, pp. 1-16.
(Continued)

*Primary Examiner* — Emmanuel E Duke
(74) *Attorney, Agent, or Firm* — Tarolli, Sundheim, Covell & Tummino LLP

(57) ABSTRACT

A method and device for freezing food items in a controlled and homogeneous manner. The method and device use plate freezers to bring the food items in a regulated manner through the whole freezing process.

14 Claims, 3 Drawing Sheets

(51) Int. Cl.
  *A23B 2/82* (2025.01)
  *F25D 29/00* (2006.01)

(52) U.S. Cl.
  CPC .......... *F25D 29/00* (2013.01); *A23V 2002/00* (2013.01); *F25D 2331/804* (2013.01); *F25D 2400/30* (2013.01)

(58) Field of Classification Search
  CPC .... A23B 2/8033; A23B 2/82; A23V 2002/00; F25B 2700/21175
  See application file for complete search history.

(56) References Cited

U.S. PATENT DOCUMENTS

| | | | | |
|---|---|---|---|---|
| 4,984,435 | A | * | 1/1991 | Seino ................ F25D 17/02 62/185 |
| 2002/0195234 | A1 | | 12/2002 | Wu |
| 2004/0000699 | A1 | | 1/2004 | Brogle |
| 2010/0212343 | A1 | | 8/2010 | Swofford et al. |
| 2019/0011169 | A1 | | 1/2019 | Oikawa |

FOREIGN PATENT DOCUMENTS

| | | | | |
|---|---|---|---|---|
| DE | 726742 | C | | 10/1942 |
| EP | 0382966 | A1 | * | 8/1990 ........... F25D 25/028 |
| EP | 0452844 | A1 | | 10/1991 |
| EP | 2273220 | A2 | | 1/2011 |
| EP | 2702341 | B2 | | 9/2018 |
| JP | 2006071128 | A | * | 3/2006 |

OTHER PUBLICATIONS

Search Report—Iceland for corresponding Application Serial No. EU 050283, dated Jan. 30, 2020, pp. 1-2.

* cited by examiner

METHOD AND DEVICE FOR HOMOGENEOUS FREEZING

RELATED APPLICATIONS

This application is a U.S. National Stage Application filed under 35 USC 371, claiming priority to Serial No. PCT/IS2020/050018, filed on 25 Aug. 2020; which claims priority from Patent Application 050283, filed 26 Aug. 2019, the entireties of which are hereby incorporated herein by reference.

FIELD OF THE INVENTION

The invention provides a method for freezing food items and maintaining freshness and quality of food items through the process of freezing and thawing of food items.

Furthermore, the present invention provides a new method and a device for homogeneously freeze food items in plate freezers.

BACKGROUND

There is a growing demand for new technology in the food industry for ways to provide frozen food to the market being as close to fresh food as possible. Current freezing technology uses plate and rack freezing devices to freeze packed food items for the market. When food items such as packed fish or fish fillets/steaks are frozen, these food items are placed in boxes directly, or in plastic wrappings, or in vacuum. Then the packings are placed in plate or rack freezers at a temperature up to −55° C. In such devices the food items are subjected to a huge temperature difference ($\Delta T$) at the beginning of the freezing process. For "wet" food items such as fish or fish products this results in a shell formation around the food items and the remaining freezing process is focused on transferring the warmer temperature out of the food items, through the shell and bringing colder temperature inside the food items, also through the shell. These are rough conditions for the food items and will resolve in explosion of a lot of the cells in the food items.

Freezing food items is an energy demanding process and current devices use a cooling medium such as cooled air blown over the food items or cooling plates where liquid and/or gas cooling medium flow through hollow spaces within the cooling plates. It is common to use plate freezers for freezing brick-shaped packaged products using refrigerant to circulate inside thin channels within the plates. In such freezer the packaged food items are usually firmly fitted between the plates for optimal heat exchange between the plates and the packed food items.

When cooling food items in rack or plate freezers each self or plate is filled with food items and a cooling medium is introduced at full force to bring the food items down to a desired temperature as quickly as possible for efficiency and energy consumption management. One of the problems with industrial plate freezers is that an even distribution of the cooling medium through each plate of the freezer difficult to regulate due to the size of the freezers and the nature of the cooling medium. This means that the food items need a longer time in the freezer until all the food items are frozen, which is costly and more cooling medium is require for freezing each food item.

EP 1,009,962 discloses a conventional type of a freezing tunnel device having a plurality of freezing tunnels and fans which circulate cold air into the freezing tunnels from condensers containing a refrigerating medium.

EP 2,702,341 discloses a method and a device for periodic in-feeding of boxes containing food items into traditional plate freezers where food items in boxes are pushed into and out of the freezer using plates with cooling medium flowing through them. This device solves the shortcomings of traditional methods where the boxes are damaged and the food objects within the boxes are harmed. The method and device provide a solution where every box is only pushed in as far as destined to, so that the unfrozen box will never be subject to more stress or force than necessary by using an unfrozen box to push another box further into the freezer or out of the freezer.

SUMMARY OF THE INVENTION

The present invention provides a system, a method and an apparatus for freezing food items in a homogeneous manner where the quality of the freezing process is increased and the use of energy for the freezing process is reduced. Automatic industrial plate freezers are loaded with food items for freezing and then the food items are removed from the freezer. The solution provided herein ensures that each plate in the freezer is controlled individually and the temperature of the cooling medium in each plate is regulated and kept below a predefined and set temperature through the freezing process.

In some embodiments the temperature limit of the cooling medium is set near the phase transition of liquid to gas, the flow of cooling medium can be regulated such that the cooling medium is in liquid form as it enters each plate but in a gas form as it exits the plate thereby maximising the use of the cooling medium, but preventing that some plates take in cooling medium at or near the temperature of phase transition to gas form. By increasing the quality of the freezing process, it is meant that the quality of the food product is increased in terms of freshness, colour and taste when it is consumed or further processed. The present invention provides a new way of freezing food items which reduces waste of food as a lesser portion of the food items are damaged during the freezing process.

In some embodiments regulation of $\Delta T$ between the temperature of the food items and the temperature of the cooling medium is used to evenly and homogeneously freeze the food items towards and through the phase transition of the food items to a desired storage temperature of the food items. The method of the present invention brings the cooling medium towards the food items to be frozen in such a manner and at such a rate that the heat exchange process within the food items is regulated such that the warmer temperature leaving the food items and the colder temperature entering the food items is similar in both directions and happens gradually as regulated by the method and the device of the invention. By regulating the flow of refrigerant or cooling medium through the freezing device in accordance with the decreasing temperature of the food items, damage of the food items due to rapid freezing is prevented and energy is saved by less use/pumping of cooling medium into the device. The present invention ensures better use of each unit of cooling medium into the device and at the same time the whole food item is taken homogeneously through the cooling process, where shell formation does not prevent cooling forces to enter the food item and the heat to leave the food items.

The method and device of the present invention uses the heat transfer coefficient of the food items to be frozen and individual regulation of the cooling and freezing environment around the food items to evenly and homogeneously freeze the food items in a manner where damages due to the freezing method and apparatus are reduced.

The present invention relates to a cooling and freezing device comprising a plurality of heat exchange plates, where the plates have hollow spaces for the cooling medium to flow through. The flow through each plate is individually controlled and the flow into and out of each plate is regulated such that the food items are gradually brought down to cooling and/or freezing according to a pre-defined time schedule, which is based on the heat transfer coefficient of the items being cooled down or frozen. The device and the method use a sensor at or near the outlet of each plate to control the flow through each plate. The device and method can be set up such that the products on each plate go through the freezing process based on the plate they rest on or on both the plates below and above the products. The food items can go through the freezing process plate by plate or in a block of number of plates at the time. In the case of putting a number of plates through the process simultaneously, the regulation of cooling medium through the plates is done block by block so that all the plates in the block are controlled simultaneously. As the temperature of the cooling medium is monitored, the computer detects when the cooling medium stops to take up heat and therefore determines when the food items are frozen. The present invention brings the food items on each plate or a set of plates simultaneously and homogenously through the freezing process, which reduces freezing time and use of cooling medium. By monitoring the outgoing cooling medium form each plate, a sensor can detect when the cooling medium stops heating up after being pass through the plate, thereby signalling that the food items on the plate are frozen.

It is an object of the present invention to overcome or ameliorate the aforementioned drawbacks of the prior art and to provide an improved and/or alternative and/or additional method for freezing food items, such as fish, for storing and/or transporting. It is one preferred object of the present invention to provide a method and device for freezing food items such as fish in a controlled manner for time-controlled homogeneous freezing of the food items. In one preferred object of the present invention a system is provided for freezing food items, where the food items are frozen in packs in plate freezers, where the temperature of the cooling medium is monitored and inflow of new cooling medium is regulated to provide even and homogeneous freezing of the food items. Moreover, it is a preferred object of the present invention to provide a method, preferably designed to take food items through a freezing process where the $\Delta T$ between the temperature of the food items and the temperature of the cooling medium is regulated through the freezing process. The solution of the present invention further provides an apparatus for freezing food items, where the device is a plate freezer and the flow of the cooling medium through each plate is independently monitored and controlled to provide an even and homogeneous freezing process for all the items in the freezer.

The object(s) underlying the present invention is (are) particularly solved by the features defined in the independent claims. The dependent claims relate to preferred embodiments of the present invention. Further additional and/or alternative aspects are discussed below.

Thus, at least one of the preferred objects of the present invention is solved by a system for freezing food items, where the system comprises providing freezer apparatus further comprising an isolated chamber, a plurality of plates arranged in the chamber with spacing between the plates, where each plate further comprises a hollow space within the plate for cooling medium to flow through, an inlet and an outlet for the cooling medium to enter and exit the plate. The freezer apparatus further comprises an inlet valve and an outlet valve to control the flow of the cooling medium through each plate. The system further comprises means for loading the food items (4) to be frozen into the freezer between each two plates (2), providing a flow of cooling medium into each plate at a pre-determined temperature, and a control means for regulating the flow of cooling medium through the freezer apparatus. The apparatus further comprises a sensor near the outlet for each plate to monitor the temperature of the cooling medium as it exits the plate and the control means regulates the flow of cooling medium to and from each plate individually. The flow of cooling medium to each plate is determined by the temperature of the cooling medium leaving each plate throughout the freezing process.

In some embodiments of the present invention, the following features may be employed: a) using regulation of $\Delta T$ between the temperature of the food items and the temperature of the heat transfer means (i.e. the cooling medium and the surface temperature of the plates) through the cooling and freezing process to enable homogeneous, even and gentle freezing process and thereby provide quality freezing and protection of the quality of the food items, b) control of the flow of cooling medium through each plate individually to provide the same regulated freezing process for all the items in the freezing device, c) placing a sensor for determining the temperature of the outgoing cooling medium of each plate in the outlet piping for each plate and use the detected temperature to control in-feeding of cooling medium into each plate and thereby regulate the cooling rate of the items on each plate and d) determining the cooling and freezing time and temperature change in the process based on the heat transfer coefficient of the food items to be frozen to ensure that all the food items go through the phase transition homogeneously.

At least one of the preferred objects of the present invention is solved by an apparatus for freezing food items. The apparatus comprises: i) an isolated chamber, ii) a plurality of plates arranged in the chamber with spacing between the plates such that the food items are loaded into the freezer apparatus between the plates and where each plate further comprises a) a hollow space within the plate for cooling medium to flow through, and b) an inlet and an outlet for the cooling medium to enter and exit the plate. The freezer apparatus further comprises iii) an inlet valve and an outlet valve to control the flow of the cooling medium to each plate and vi) a control computer for controlling the flow of cooling medium into each plate. The apparatus further comprises a sensor near the outlet for each plate to monitor the temperature of the cooling medium as it exits the plate. The flow of cooling medium to each plate is determined by the temperature of the cooling medium leaving each plate throughout the cooling/freezing process and wherein the control computer regulates the flow of cooling medium to and from each plate individually.

Another preferred object of the present invention is solved by a method for freezing food items. The method comprises the steps of a) loading food items onto a plate of the freezer apparatus of the present invention, b) starting a flow of cooling medium into the plate with food items at a pre-determined temperature, c) determining the temperature of the cooling medium after it has flowed through the plate, and d) repeating steps a) through c) for each plate in the freezer. The method further provides determining the flow of cooling medium to each plate based on the temperature of the cooling medium leaving each plate throughout the cooling/freezing process and that the control computer regulates the flow of the cooling medium to and from each plate individually.

At least one of the preferred objects of the present invention is solved by a method for thawing frozen food items. The method comprises the steps of a) loading food items onto a plate in the chamber of the apparatus of claims 1 through 5, b) starting a flow of heat exchange medium into the plate with food items at a pre-determined temperature, c) determining the temperature of the heat exchange medium after it has flowed through the plate, and repeating steps a) through c) for each plate in the chamber. The method further provides that the computer regulates the flow of the heat exchange medium to each plate individually and that the flow of heat exchange medium is determined by the temperature of the heat exchange medium leaving each plate throughout the thawing process. For such an object, the control computer regulates the flow of the heat exchange medium through each plate such that the items on each plate are gradually heated up towards the phase transition of the food items and then taken slowly through the phase transition of the food items to provide a homogeneous thawing process for the whole product.

Another preferred object of the present invention is solved by a system for automatic and homogenous freezing food items, where the system comprises i) providing freezer apparatus according to the present invention comprising a plurality of horizontally arranged plates in the chamber, ii) means for loading the food items to be frozen onto each plate in the freezer apparatus, iii) providing a flow of cooling medium into each plate at a pre-determined temperature, and iv) control means for controlling the flow of cooling medium into each plate. The freezer apparatus further comprises a sensor in the outlet piping for each plate to monitor the temperature of the cooling medium as it exits the outlet piping. The control means regulates the flow of cooling medium to and from each plate individually, where the flow of cooling medium to each plate is determined by the temperature of the cooling medium leaving each plate throughout the freezing process.

Another preferred object of the present invention is solved by a method automatic and homogenous freezing of food items. The method comprising the steps of: a) providing freezer apparatus according to the present invention, b) loading food items onto a plate of the freezer apparatus, c) starting and maintaining a flow of cooling medium though the plate with food items at a pre-determined temperature, d) determining the temperature of the cooling medium after it has flowed through the plate, e) repeating steps b) through d) for each plate in the freezer. The apparatus further comprises a sensor near the outlet for each plate to monitor the temperature of the cooling medium as it exits the plate and method further comprises f) the control means regulating the flow of cooling medium to and from each plate individually, where the flow of cooling medium to each plate is determined by the temperature of the cooling medium leaving each plate throughout the freezing process.

DESCRIPTION OF THE INVENTION

The following definitions and embodiments relate to the method, the system and the apparatus of the invention.

In the present context the terms "freezer" and "freezer apparatus" relates to plate freezing devices where the cooling medium is guided through hollow spaces or flow channels in the plates to provide heat exchange between the food items and the cooling medium. The freezers can be horizontal or vertical plate freezers.

In the present context the terms "cooling medium" or "heat exchange medium" equally refer to any liquid or gas medium which can be injected into cooling device to facilitate heat exchange between the food items and the cooling medium.

In the present context the term "heat exchange medium" also refers to any liquid or gas medium which can be injected into heat exchange devices such, the plate freezer devices disclosed herein, to facilitate heat exchange between the food items and the heat exchange medium in the process of thawing food items.

In the present context the terms "control computer" or "control means" refer to computing or processing means which regulate the apparatus and system of the present invention by receiving signals from sensors, comparing the signals to processing schemes and reference values and give operating signals to valves to control the flow of heat exchange medium through heat exchange devices such as freezers of the present invention.

In the present context, control computer, sensors and valves are connected as is known in the art in such a manner that the control computer can receive readings or measurements from sensors and calculate and/or make reference to predetermined rules or schemes for the cooling/freezing process being executed and give commands to means operating valves to control the flow of cooling or heating medium into and out of the plates.

In the present context the flow of cooling or heating medium into and out of each plate is controlled individually for each plate and independently of the cooling rate through adjacent plates, although in the case where racked plates are being sequentially filled one after another, the cooling process of an adjacent plate is even to, just ahead or just behind the cooling process of the present plate.

In the present context the term "ΔT between the food items and the cooling medium" refers to the temperature difference between the temperature of a food item at each time of the cooling process and the temperature of the cooling medium being proved at that particular time of the cooling/freezing process.

In the present context the terms "plate" or "freezer plate" refer to heat exchange elements arranged vertically or horizontally in a device to facilitate heat exchange of food items. The plates or freezer plates have a hollow space or channels within the plate for the heat exchange medium to flow through. As the apparatus, system and method of the present invention can be used for cooling down, freezing or thawing food items, heat exchange medium can be passed through the plates for all purposes.

In the present context the term "food items" refers to any food items such as slaughtered animals, such as, but not limited to fish or chicken, as well as for parts of animals such as aquatic animals, birds or other smaller slaughtered animals.

In the present context the term "fish" or "whole fish" relates to a fish which is either freshly caught and unprocessed at all or cut and/or bled and/or gutted and/or washed and/or graded and/or de-headed and/or the tail has been removed or any combination thereof.

In an embodiment of the present invention a pre-defined temperature limit is set for the cooling medium leaving each plate throughout the freezing process and wherein the control means regulates the flow of cooling medium to each plate to keep the temperature of the cooling medium below said pre-defined temperature limit.

In an embodiment of the present invention the pre-defined temperature limit set for the cooling medium leaving each plate throughout the freezing process is gradually decreased until the food items in the freezer are frozen.

In an embodiment of the present invention the pre-defined temperature limit set for the cooling medium leaving each plate throughout the freezing process is based on keeping the temperature of the cooling medium leaving each plate near the phase transition of the cooling medium from liquid phase to gas phase.

In an embodiment of the present invention the pre-defined temperature limit is set at a value where the cooling medium leaving each plate throughout the freezing process is in gas phase.

In an embodiment of the present invention the hollow space of each freezer plate is in the form of flow channels within the freezing plates and allow the cooling medium to flow from one side of the plate to the other.

In an embodiment of the present invention the cooling medium is NH3.

In an embodiment of the present invention the control computer regulates the flow of cooling medium to and from each freezing plate according to a predefined scheme based on the food items to be frozen.

In an embodiment of the present invention the apparatus further comprises in-feed piping and outlet piping to transfer the cooling medium to and from each cooling plate.

In an embodiment of the present invention the sensor is positioned in the outlet piping for each plate.

In an embodiment of the present invention the freezer plates are horizontally arranged within the freezing chamber.

In an embodiment of the present invention the hollow space within the plate is formed as a flow channel for the cooling medium to flow through from the inlet to the outlet.

In an embodiment of the present invention the isolated chamber is a freezer chamber arranged to house plates with channels for heat exchange medium to flow through said plates.

In an embodiment of the present invention, flow channels within the freezing plates allow the cooling medium to flow from one side of the plate to the other.

In an embodiment of the present invention the isolated chamber is a freezer chamber arranged to house plates with channels for heat exchange medium to flow through said plates.

In some embodiments the computer regulates the flow of cooling medium to each plate individually according to predetermined scheme based on the food items to be frozen.

In an embodiment of the present invention the computer regulates the flow of cooling medium to maintain a predetermined $\Delta T$ between the food items and the cooling medium in each plate throughout the cooling/freezing process.

In an embodiment of the present invention the $\Delta T$ between the food items and the cooling medium in each plate differs for different stages of the cooling/freezing process.

In some embodiments the control computer regulates the $\Delta T$ between the food items and the cooling medium in each plate such that the temperature of the cooling medium in each plate is gradually cooled down at a first predefined rate to the phase transition of the food items, then at a second predefined rate through the phase transition of the food items and then at a second predefined rate after the phase transition of the food items.

In some embodiments the freezer apparatus is loaded from top to bottom or vice versa and wherein the plate above the food items contributes to the cooling of the food items and is following an adjacent scheme of cooling/freezing.

In some embodiments the control computer regulates the flow of the cooling medium through each plate such that the items on each plate are gradually cooled down towards the phase transition of the food items and then taken slowly through the phase transition of the food items to provide a homogeneous cooling and freezing process for the whole product through the freezing process.

In some embodiments the control computer regulates the flow of the heat exchange medium through each plate such that the items on each plate are gradually heated up towards the phase transition of the food items and then taken slowly through the phase transition of the food items to provide a homogeneous thawing process for the whole product.

In an embodiment of the present invention the food item is selected from freshly slaughtered fish, freshly slaughtered chicken, beef, pork, and lamb meat products.

In some embodiments the food item is fish selected from salmon, trout, cod, haddock, pollock, catfish, ling, blue ling, tusk, monkfish, carp, bass, bream, turbot, sea bass, sole, milkfish, grey mullet, grouper, sea bream, halibut, flounder, Japanese flounder.

In an embodiment of the present invention the food items are packed in boxes with or without being individually packed within the boxes.

In an embodiment of the present invention the cooling medium is in a liquid form as it enters the plate but is in a gas phase when it exits the outlet tubing from the plate.

DESCRIPTION OF VARIOUS EMBODIMENTS

The present invention will become more fully understood from the detailed description given hereinafter and the accompanying drawings which are given by way of illustration only, and thus are not limitative of the present invention, and wherein.

Figure 1:
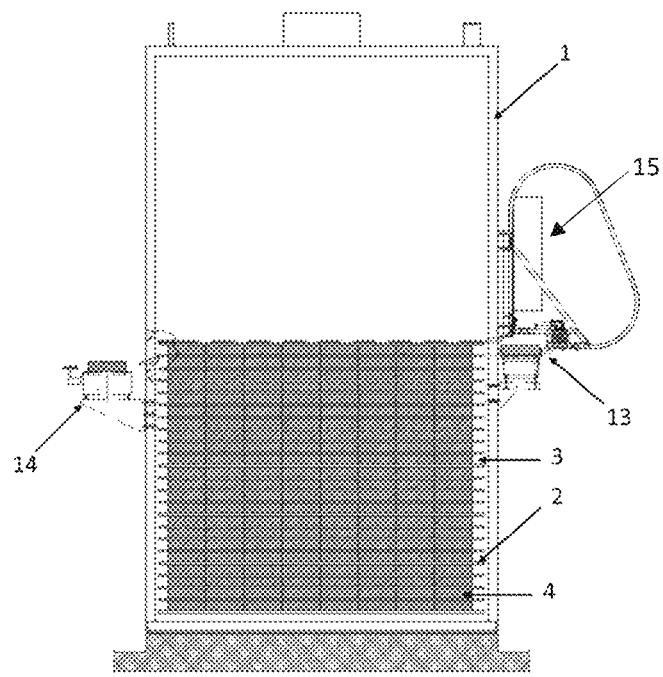
FIG. 1 is a cross section of a horizontal plate freezer.
Figure 2:
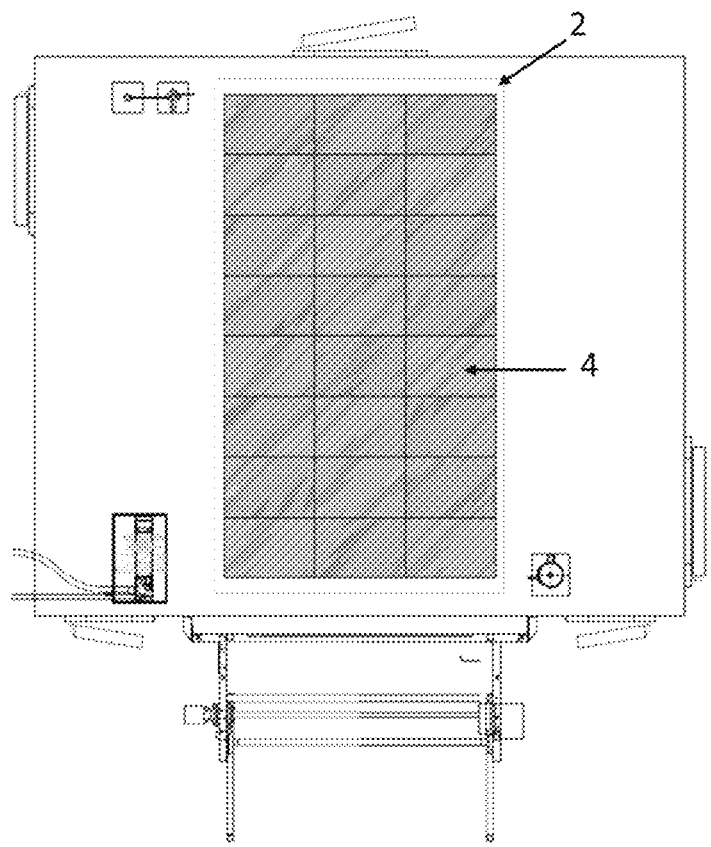
FIG. 2 is a top view of a horizontal plate freezer.

FIG. 1 shows a cross section of an automatic plate freezer, and FIG. 2 shows a projection (or top view) of the same freezer chamber 1. FIG. 1 shows food items 4 packed in boxes hi rows on each plate 2 in the freezer. The food items enter the freezer in boxes by a conveyor belt, and an in-feeding device 13 places the boxes onto the freezer plates. The freezer shown in FIGS. 1 and 2 comprises 24 freezing plates, but the number and size of places for each freezer depends on the performance required and the size of the boxes desired. The size of the gap/space 3 between the freezer plates can be varied based on the size of the packings containing the food items to be packed. This will result in that the food products will not be harmed or crushed, and careful handling is ensured. The in-feeding device 13 is kept at a constant height whereas the freezer plates on which the boxes are being placed are adjusted to the height of the in-feeding device 13. In this embodiment, the in-feeding starts for the top plate and then the next one below and then one by one until the freezer is filled with boxes for freezing. The outlet belt 14 is shown on the other side of the chamber.

Figure 3:
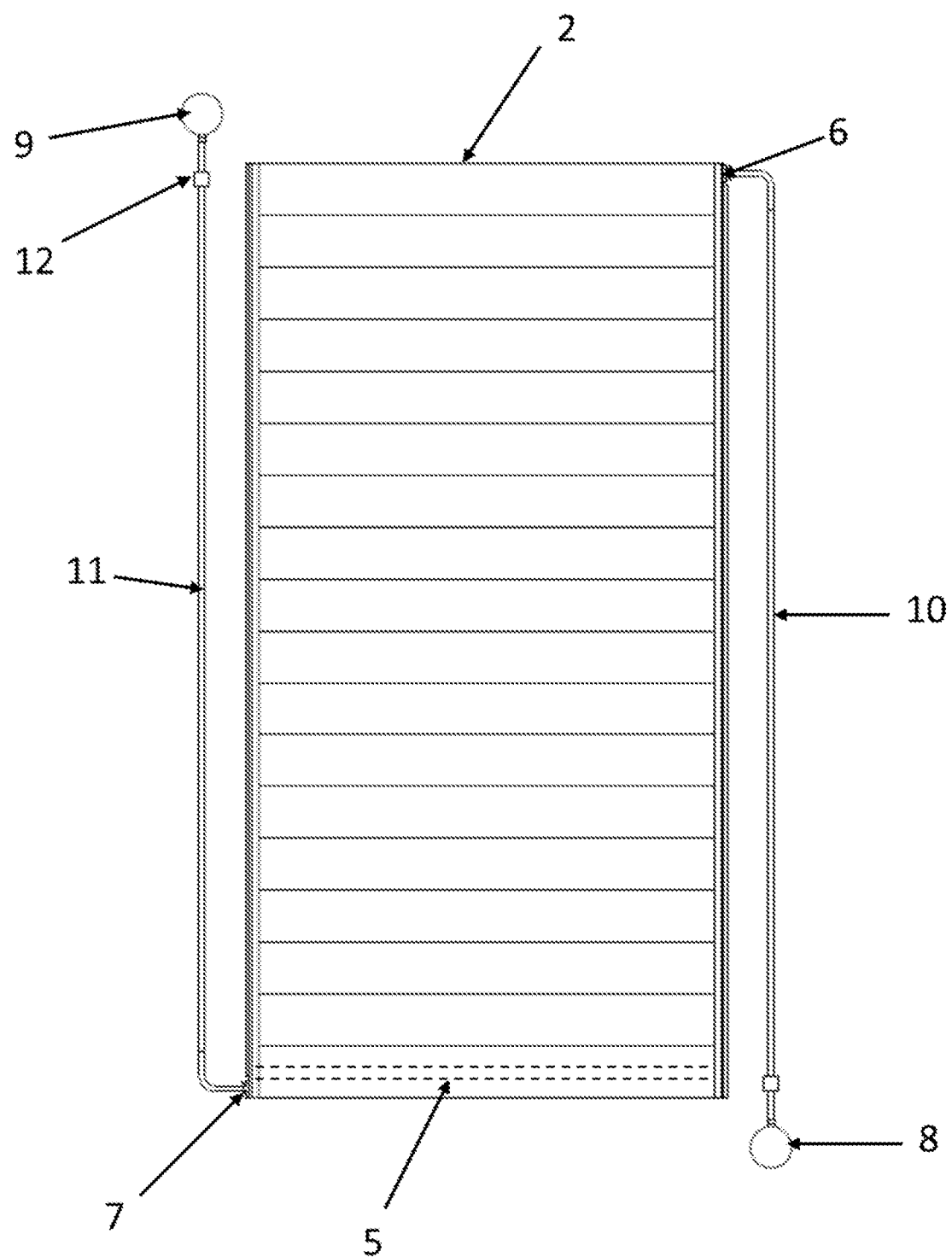
FIG. 3 is a top view of a plate in the apparatus of the present invention.

FIG. 3 is a top view of a single plate in an apparatus of the invention. The plate has an inlet 6 and an outlet 7 for the heat transfer medium to enter and exit the plate 2 and the dotted lines indicate flow channels within the plate for facilitating flow of heat exchange medium through the plate. The inlet 6 is connected to an inlet valve 8 through an in-feed piping 10 and the outlet is connected to an outlet 9 through an outlet piping 11. The valves 8, 9 control the flow of the heat transfer medium through the plate 2 through the in-feed piping 10 and outlet piping 11. The flow of cooling medium into each plate is controlled by a control computer (shown schematically at 15 in FIG. 1). A sensor 12 is provided for each plate in the outlet piping 11 near the outlet valve 9 to monitor the temperature of the heat transfer medium as it exits the outlet piping 11.

Figure 4:
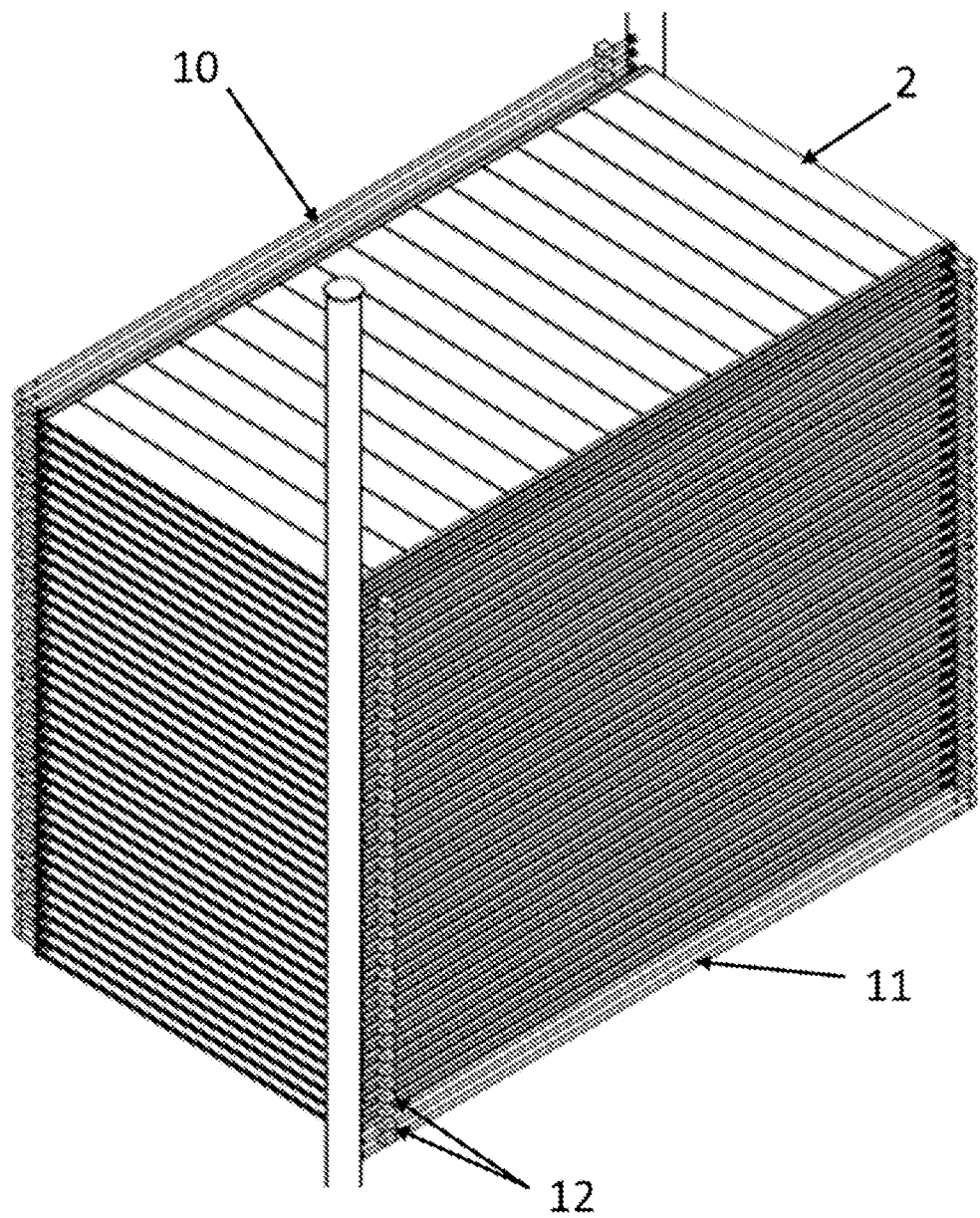
FIG. 4 is a perspective view of a stack of plates for the apparatus of the present invention.

FIG. 4 shows a rack of plates 2 for an apparatus of the present invention. The figure shows how each plate has its own in-feed piping 10 and outlet piping 11, as well as a sensor 12 in each of the outlet piping 11. The sensor is then connected to the control computer 15 so that the control computer 15 can regulate the flow of the heat transfer medium to each plate based on the temperature of the heat transfer medium leaving each plate at any time individually.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. A system for freezing food items, said system comprising: providing freezer apparatus further comprising an isolated chamber, a plurality of plates arranged in the chamber with spacing between the plates, where each plate further comprises: i) a hollow space within the plate for cooling medium to flow through, ii) an inlet and an outlet for the cooling medium to enter and exit the plate, iii) an inlet valve and an outlet valve to control the flow of the cooling medium through each plate, in-feeding device for loading the food items to be frozen into the freezer between each two plates, providing a flow of cooling medium into each plate at a pre-determined temperature, and a control computer for regulating the flow of cooling medium through the freezer apparatus, wherein the apparatus further comprise sensors near the outlet for each plate to monitor the temperature of the cooling medium as it exit the each plate, and wherein the control computer regulates the flow of cooling medium to and from each plate individually, where the flow of cooling medium to each plate is determined by the temperature of the cooling medium leaving each plate throughout the freezing process.

2. The system according to claim 1, wherein a pre-defined temperature limit is set for the cooling medium leaving each plate throughout the freezing process and wherein the control computer regulates the flow of cooling medium to each plate to keep the temperature of the cooling medium below said pre-defined temperature limit.

3. The system according to claim 2, wherein the pre-defined temperature limit set for the cooling medium leaving each plate throughout the freezing process is gradually decreased until the food items in the freezer are frozen.

4. The system according to claim 2, wherein the pre-defined temperature limit set for the cooling medium leaving each plate throughout the freezing process is based on keeping the temperature of the cooling medium leaving each plate near the phase transition of the cooling medium from liquid phase to gas phase.

5. The system according to claim 4, wherein the pre-defined temperature limit is set at a value where the cooling medium leaving each plate throughout the freezing process is in gas phase.

6. The system according to claim 1, wherein the hollow space is in the form of flow channels within the freezing plates and allow the cooling medium to flow from one side of the plate to the other.

7. The system according to claim 1, wherein the cooling medium is NH3.

8. The system according to claim 1, wherein the control computer regulates the flow of cooling medium to and from each freezing plate according to a predefined scheme based on the food items to be frozen.

9. An apparatus for freezing food items, said apparatus comprising:
an isolated chamber, plurality of plates arranged in the chamber with spacing between the plates for food items to be loaded into the freezer apparatus between the plates, wherein each plate further comprises: i) a hollow space within the plate for cooling medium to flow through, and ii) an inlet and an outlet for the cooling medium to enter and exit the plate, an inlet valve and an outlet valve to control the flow of the cooling medium to each plate, wherein the apparatus further comprise sensors near the outlet for each plate to monitor the temperature of the cooling medium as it exits each plate; and a control computer for regulating the flow of cooling medium through each plate individually, wherein the flow of cooling medium to each plate is determined by the temperature of the cooling medium leaving each plate throughout the cooling/freezing process.

10. The apparatus according to claim 9, further comprising in-feed piping and outlet piping to transfer the cooling medium to and from each cooling plate.

11. The apparatus according to claim 10, wherein the sensor is positioned in the outlet piping for each plate.

12. The apparatus according to claim 9, wherein the freezer plates are horizontally arranged within the freezing chamber.

13. The apparatus according to claim 9, wherein the hollow space within the plate is formed as a flow channel for the cooling medium to flow through from the inlet to the outlet.

14. The apparatus according to claim 9, wherein the isolated chamber is a freezer chamber arranged to house plates with channels for heat exchange medium to flow through said plates.

* * * * *